V. V. PITTMAN.
COOLER.
APPLICATION FILED AUG. 8, 1916.
1,242,036.
Patented Oct. 2, 1917.
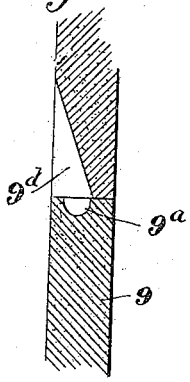
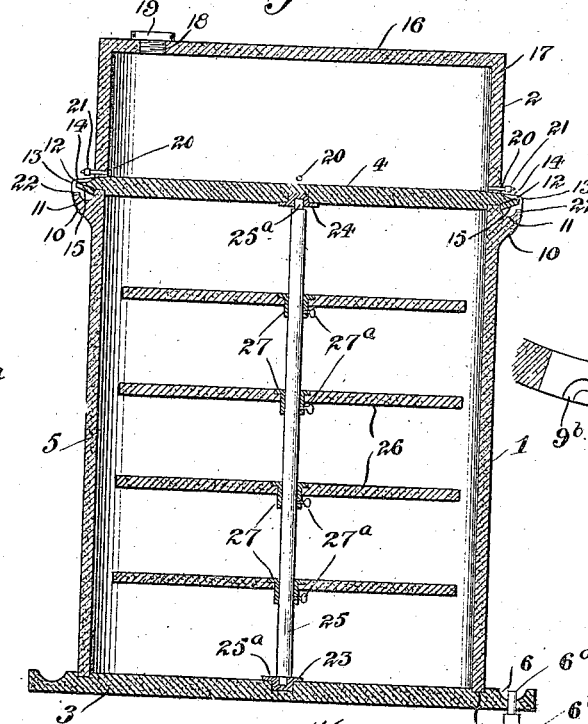
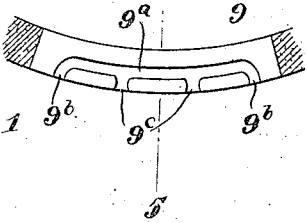
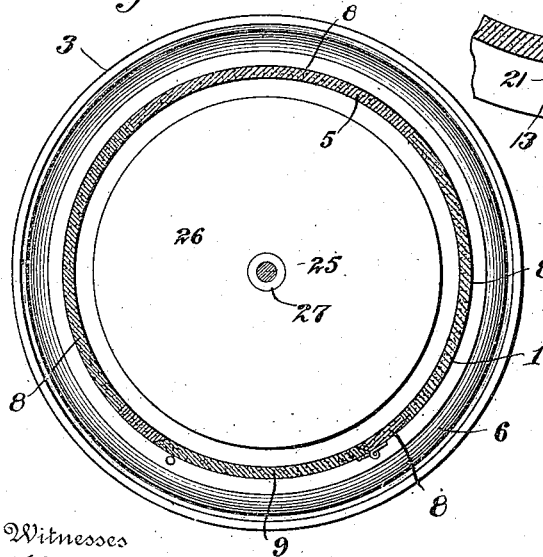
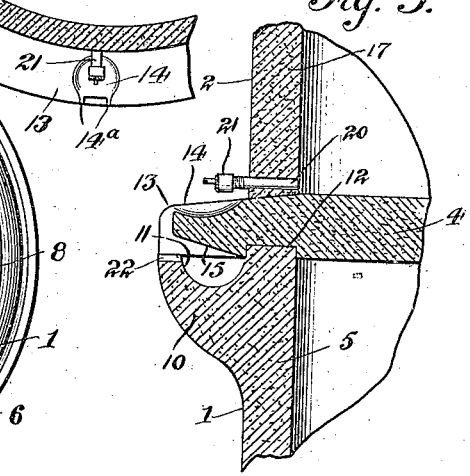
Witnesses
F. W. Windridge.
J. W. Warner
Inventor
V. V. Pittman.
By Victor J. Evans
Attorney

UNITED STATES PATENT OFFICE.

VINCENT V. PITTMAN, OF SELMA, CALIFORNIA.

COOLER.

1,242,036.  Specification of Letters Patent.  Patented Oct. 2, 1917.

Application filed August 8, 1916. Serial No. 113,788.

*To all whom it may concern:*

Be it known that I, VINCENT V. PITTMAN, a citizen of the United States, residing at Selma, in the county of Fresno and State of California, have invented new and useful Improvements in Coolers, of which the following is a specification.

This invention relates to improvements in coolers, particularly to the class of portable coolers for refrigerating purposes, the present invention being an improvement on the cooler described and claimed in the Letters Patent of the United States #1,138,505 granted to me on May 4, 1915.

One object of the invention is to effect improvements in the construction of the top of the body of the cooler and which also forms the bottom of the tank or reservoir.

Another object is to provide valves to regulate the escape of water from the tank.

Another object is to provide the wall sections of the body with a drip channel near their upper ends.

The invention consists in the features of construction, combination, and arrangement of devices, hereinafter fully described and claimed.

In the accompanying drawings:—

Figure 1 is a vertical sectional view of a cooler constructed and arranged in accordance with my invention.

Fig. 2 is a horizontal sectional view of the same.

Fig. 3 is a detail sectional view.

Fig. 4 is a detail top plan view of the door.

Fig. 5 is a detail vertical sectional view through the top and the contiguous upper portion of the wall.

Fig. 6 is a detail top plan view.

The cooler comprises a body 1 and a tank or water reservoir 2. The body comprises a bottom 3, a top 4 and a wall 5, and together with the tank is preferably made of cement. The bottom is circular and is provided with an annular groove or channel 6 in its upper side and is also provided in its upper side with a groove 7 which receives the lower edge of the wall 5. The wall is composed of segmental sections 8, one of which is formed with an opening and with a hinged door 9 to close said opening as shown.

A drainage and overflow nipple $6^a$ has its upper end arranged at a suitable height above the bottom of the channel 6. The lower end of this nipple extends below the bottom 3 and a suitable flexible hose $6^b$ may be attached to the lower end of the nipple to carry off the overflow water from the channel to a suitable place.

Each wall section is formed of a flange 10 on its outer side near its upper end which projects outwardly therefrom and in the upper side of which is a water channel 11. The element 4 which forms the top of the body and also forms the bottom of the tank 2 has a groove 12 in its lower side which receives the upper edge of the wall 5. The extreme diameter of the element 4 is greater than that of the body, so that said element 4 projects outwardly to form a ledge 13 which extends around the body. Said ledge is provided at points below the discharge valves 21 of the tank 2 with basins 14 which are scooped therein and is also provided with notches $14^a$ in the outer walls of said basins for the escape of water therefrom, said notches leading downwardly and said element 4 having downwardly and inwardly inclined surfaces 15 between such notches to assist in conducting the water to the channel or gutter 11. Said gutter or channel overflows, so that water passes therefrom downwardly over the flange 10 and spreads over the outer surface of the wall 5 keeping such surface wet and such water as does not evaporate on the outer surface of the wall, finally reaches the lower gutter or channel 6.

To increase the superficial area of the wall 8 and cause maximum evaporation on the moistened outer surface thereof, I coat the outer surface of the wall sections, while the cement mortar, of which they are composed, is in a plastic state, with dry sand, which becomes cemented on and becomes a perfect surface for spreading the water on the wall and to promote the evaporation of the water thereon.

The door 9 is provided with a channel $9^a$ in its upper edge, and which opens, at the ends, outwardly as at $9^b$ and the outer wall of said channel is also formed with notches $9^c$. The wall section in which the door is hinged and which forms the frame for the door, is provided with notches $9^d$ to conduct water to such channel $9^a$ as will be understood.

The tank 2 comprises an integral top 16 and a wall 17. The top is provided with a hole 18 to enable water to be supplied to the tank and a stopper 19 may be provided for such hole. The lower edge of the wall 17 fits closely on the sloped upper surface of the element 4, which element forms the bottom of the tank as well as the top of the body of the cooler. Four, or any other suitable number of pipes 20 which may be constructed of lead and which are of very slight diameter, preferably of about a quarter of an inch, pass through the wall 17 near its lower edge and each of these pipes is provided with a suitable water escape regulating valve 21, which in practice is preferably an ordinary bicycle valve with the inside spring removed. These valves regulate the passage of water from the tank and enable the cooler to be kept in operation for a long time with one filling of the tank. The upper edge of the flange 10 is preferably provided with small incisions 22 to form outlets for the water from the channel 11.

Sockets 23, 24, are arranged in the centers of the bottom and top of the body as shown. The socket 24 receives the upper end of a rod 25 said rod has a plug 25ª at the lower end which bears in the socket 23. Said rod carries and permits the rotation of a suitable number of disk like shelves 26. Each of said shelves has a centrally arranged sleeve 27 through which the rod extends and said sleeve has a set screw 27ª. Hence the shelves may be vertically adjusted on the rod as desired. The shelves being revoluble, enable food products to be readily placed thereon or removed therefrom through the door. The shelves and other concrete portions of the cooler are in practice reinforced.

Having described the invention, what is claimed is:

1. A cooler of the class described comprising a body, a tank thereon, an element forming the top of the body and also forming the bottom of the tank and projecting out beyond the sides of the body, the projecting portion of said element having basins in its upper side and notches in the outer walls of said basins for the escape of water therefrom, water outlets for said tank and discharging in said basins.

2. A cooler of the class described comprising a body, a tank thereon, an element forming the top of the body and also forming the bottom of the tank and projecting beyond the sides of the body, and valved water outlets for said tank, the said element having a downwardly and outwardly sloped outer portion, and a downwardly and inwardly sloped under surface upon the projecting portion, and the body of the cooler being provided on its wall with an exteriorly arranged flange spaced below the outer edge of said element and having a channel for the reception of water therefrom.

In testimony whereof I affix my signature.

VINCENT V. PITTMAN.

Copies of this patent may be obtained for five cents each, by addressing the "Commissioner of Patents, Washington, D. C."